(12) United States Patent
Zavaliche et al.

(10) Patent No.: US 7,792,009 B2
(45) Date of Patent: Sep. 7, 2010

(54) FERROELECTRIC POLARIZATION PATTERN WITH DIFFERING FEEDBACK SIGNALS

(75) Inventors: Florin Zavaliche, Pittsburgh, PA (US); Philip George Pitcher, Cranberry Township, PA (US); Tong Zhao, Pittsburgh, PA (US); Dierk Guenter Bolten, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 455 days.

(21) Appl. No.: 11/865,806

(22) Filed: Oct. 2, 2007

(65) Prior Publication Data

US 2009/0086615 A1 Apr. 2, 2009

(51) Int. Cl.
*G11B 7/00* (2006.01)
(52) U.S. Cl. .................. 369/126; 977/943
(58) Field of Classification Search ............... None
See application file for complete search history.

(56) References Cited

U.S. PATENT DOCUMENTS

| | | | |
|---|---|---|---|
| 5,132,934 A | 7/1992 | Quate et al. | |
| 5,202,879 A | 4/1993 | Oguchi et al. | |
| 5,396,483 A | 3/1995 | Matsuda et al. | |
| 5,404,349 A | 4/1995 | Nose et al. | |
| 5,434,811 A * | 7/1995 | Evans et al. .................. | 365/145 |
| 5,856,967 A | 1/1999 | Mamin et al. | |
| 6,195,313 B1 | 2/2001 | Seki et al. | |
| 7,397,624 B2 * | 7/2008 | Johns et al. ................... | 360/75 |
| 7,502,304 B2 * | 3/2009 | Maeda et al. ................ | 369/126 |
| 2005/0122886 A1* | 6/2005 | Takahashi et al. ........... | 369/126 |
| 2005/0128616 A1* | 6/2005 | Johns et al. .................. | 360/15 |
| 2005/0128928 A1* | 6/2005 | Takahashi et al. ........... | 369/126 |
| 2006/0002273 A1* | 1/2006 | Takahashi et al. ........... | 369/101 |
| 2006/0023606 A1* | 2/2006 | Lutwyche et al. ........... | 369/100 |
| 2006/0039250 A1 | 2/2006 | Cherubini et al. | |
| 2006/0044958 A1 | 3/2006 | Min et al. | |
| 2006/0182004 A1* | 8/2006 | Maeda et al. ................ | 369/126 |
| 2007/0041233 A1* | 2/2007 | Roelofs et al. .............. | 365/145 |
| 2008/0151597 A1* | 6/2008 | Kiely et al. .................. | 365/145 |

* cited by examiner

*Primary Examiner*—Peter Vincent Agustín
(74) *Attorney, Agent, or Firm*—Benjamin T. Queen, II; Pietragallo Gordon Alfano Bosick & Raspanti, LLP

(57) ABSTRACT

A ferroelectric polarization pattern with differing feedback signals. An apparatus including a ferroelectric layer and a polarization pattern configured in the ferroelectric layer to represent position data. The polarization pattern has a first switchable polarization state domain and a second switchable polarization state domain that are both switchable by an applied signal. The first switchable polarization state domain has a first feedback signal in response to the applied signal that is different than a second feedback signal of the second switchable polarization state domain at the applied signal.

19 Claims, 3 Drawing Sheets

FERROELECTRIC POLARIZATION PATTERN WITH DIFFERING FEEDBACK SIGNALS

BACKGROUND

In devices that need to store information such as, for example, data storage devices, user data is typically stored on tracks of a storage media. In addition to the user data, position data is also provided on the storage media. The position data can include servo marks that, when read, generally indicate position coordinates (e.g. X, Y coordinates, track number, or sector number) of a transducer relative to the storage media surface. Such devices also include a servo system that positions the transducer over a selected track based on feedback of the position data. The servo system may have a "seek mode" that moves the transducer from one track to another track based on reading the servo marks. The servo system also may have a "tracking mode" in which the transducer is precisely aligned with a selected track based on a reading of the servo marks.

At the time of manufacture of a magnetic data storage device, the servo marks are provided on the storage media. During operational use of the magnetic data storage device, the transducer reads the servo marks but there is typically no need to erase and rewrite servo data during operation. The position of servo marks on the media for a magnetic data storage device is therefore stable and does not change significantly during the operational life of the data storage device.

Data storage devices are being proposed to provide smaller size, higher capacity, and lower cost data storage devices. One particular example of such a data storage device is a ferroelectric probe storage device. The probe storage device may include one or more transducers (e.g. one or more probes), that each includes a conductive element (e.g., an electrode), which are positioned adjacent to and in contact with a ferroelectric thin film storage media. User data is stored in the media by causing the polarization of the ferroelectric film to point "up" or "down" in a spatially small domain local to a tip of the transducer by applying suitable voltages to the transducer through the conductive element. Data can then be read by, for example, sensing current flow during polarization reversal.

For probe storage devices, position data can be written in domains polarized on the ferroelectric storage media. However, the characteristics of probe storage do not permit stable positioning of the position data. When data is read from a ferroelectric storage media with a transducer, the conventional process of reading the data inherently erases or removes the data from the media. An electronic circuit that provides the read operation for a probe storage device must follow up and automatically provide a subsequent write operation of the same data in order to avoid loss of the data on the ferroelectric storage media. This is not an insurmountable problem for user data. However, with position data (e.g. servo marks) the repeated reading and automatic rewriting of position data will inevitably lead to loss of accurate position information. This instability and loss of accurate position information limits the useful life of the probe storage device. Adjacent tracks on the ferroelectric storage media with user data will become misaligned due to creep of the position data and user data tracks will eventually overwrite or interfere with one another.

SUMMARY

An aspect of the present invention is to provide an apparatus including a ferroelectric layer and a polarization pattern configured in the ferroelectric layer to represent position data. The polarization pattern has a first switchable polarization state domain and a second switchable polarization state domain that are both switchable by an applied signal. The first switchable polarization state domain has a first feedback signal in response to the applied signal that is different than a second feedback signal of the second switchable polarization state domain at the same applied signal.

Another aspect of the present invention is to provide an apparatus including a first ferroelectric region having a plurality of first domains that each have a switchable polarization state and a second ferroelectric region adjacent the first ferroelectric region. The second ferroelectric region has a plurality of second domains that includes: a first switchable polarization state domain and a second switchable polarization state domain that are both switchable by an applied signal. The first switchable polarization state domain has a first feedback signal in response to the applied signal that is different than a second feedback signal of the second switchable polarization state domain in response to the applied signal.

A further aspect of the present invention is to provide a method that includes providing a ferroelectric layer and establishing a polarization pattern configured in the ferroelectric layer to represent position data. The polarization pattern has a first switchable polarization state domain and a second switchable polarization state domain that are both switchable by an applied signal. The first switchable polarization state domain has a first feedback signal in response to the applied signal that is different than a second feedback signal of the second switchable polarization state domain at the same applied signal.

These and various other features and advantages will be apparent from a reading of the following detailed description.

DRAWINGS

Figure 4A:
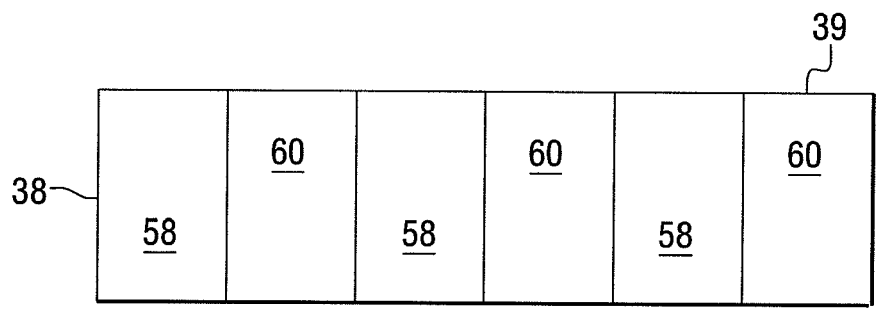
FIG. 4A illustrates a schematic cross-sectional view taken along line 4A-4A of FIG. 2.
Figure 4B:
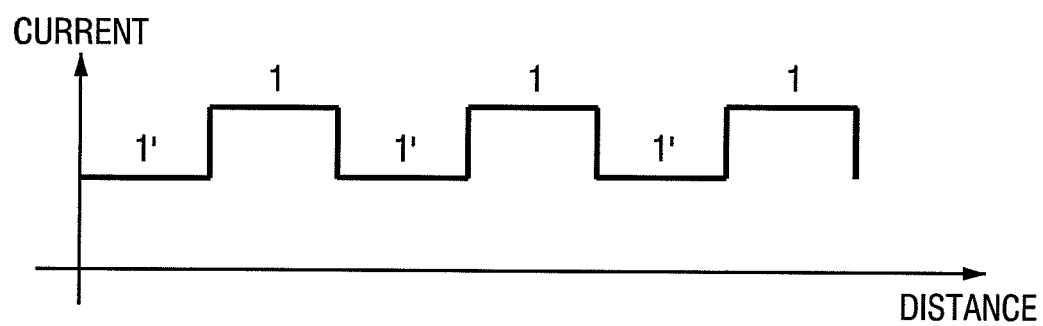

FIG. 4B corresponds to FIG. 4A and graphically illustrates current flow as a result of polarization switching for an applied voltage signal, according to one aspect of the invention.

Figure 4C:
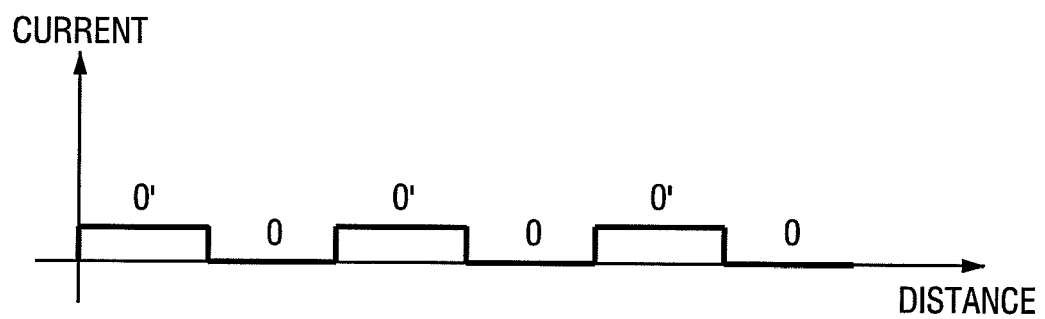

FIG. 4C corresponds to FIG. 4A and graphically illustrates current flow as a result of polarization not switching for an applied voltage signal, according to one aspect of the invention.

DETAILED DESCRIPTION

Figure 1:
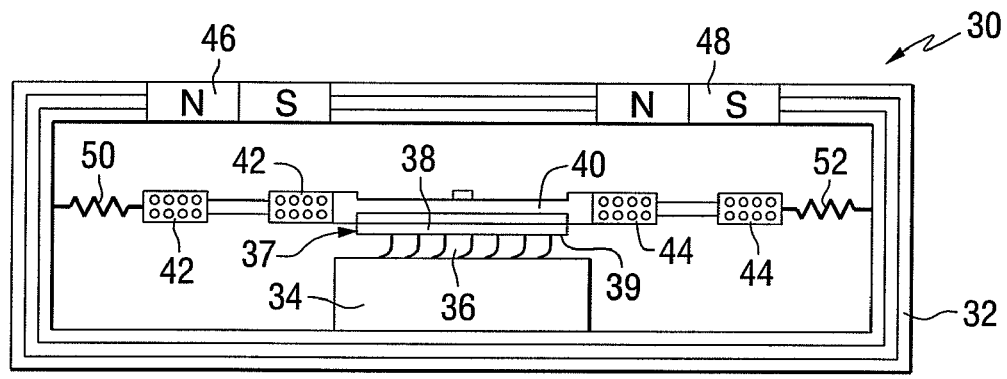
FIG. 1 is a schematic cross-sectional view of a device, according to one aspect of the invention.

FIG. 1 is a schematic cross-sectional view of a device 30 constructed in accordance with an aspect of the invention. The device 30 includes an enclosure 32 (which also may be referred to as a case, base, or frame) that contains a substrate 34. An array of transducers 36, which in accordance with one aspect of the invention may be an array of "probes," is positioned on the substrate 34. The transducers 36 extend upward to make contact with a ferroelectric storage media 37 which includes a ferroelectric storage layer 38 formed of, for example, lead zirconium titanate (PZT). The storage media 37 also includes a media surface 39. The storage media 37 is mounted on a movable member 40 (which also may be referred to as a sled). Coils 42 and 44 are mounted on the movable member 40. Magnets 46 and 48 are mounted in the enclosure 32 near the coils 42 and 44, respectively. Springs 50 and 52 form part of a suspension assembly that supports the movable member 40. It will be appreciated that the combination of coils 42 and 44 and magnets 46 and 48 forms an actuator assembly that is used to move the movable member 40. Electric current in the coils 42 and 44 creates a magnetic field that interacts with the magnetic field produced by the magnets 46 and 48 to produce a force that has a component in the plane of the movable member 40 and causes linear movement of the movable member 40. This movement in turn causes individual storage locations or domains on the media 37 to be moved relative to the transducers 36.

While FIG. 1 illustrates an example of one aspect of the invention, it will be appreciated that the invention is not limited to any particular configuration or associated components. For example, the transducers 36 can be arranged in various configurations relative to the media 37. In addition, other types of actuator assemblies, such as, for example, electrostatic actuators, could provide the relative movement between the transducers 36 and the media 37.

Figure 2:
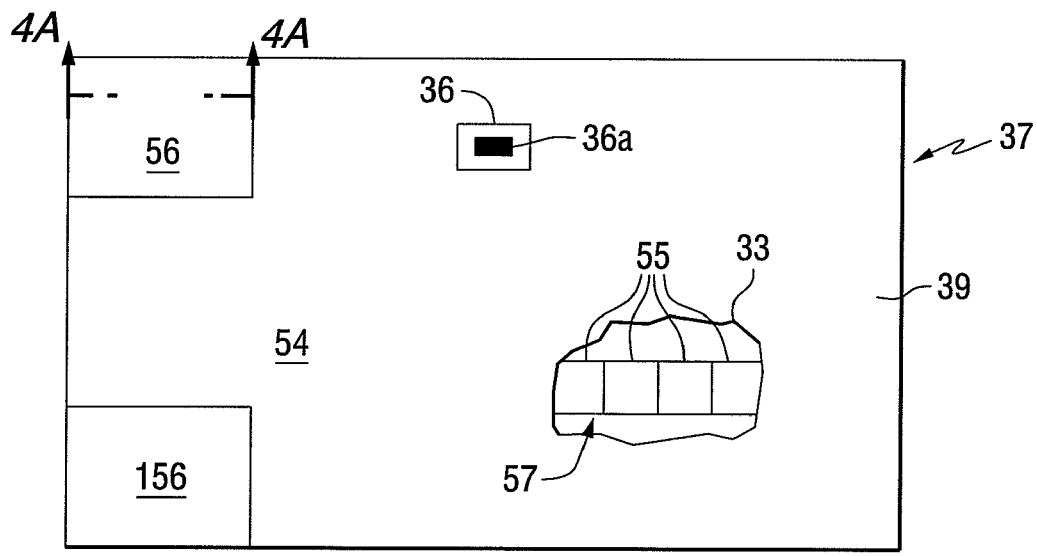
FIG. 2 is a top schematic view of a ferroelectric storage media, according to one aspect of the invention.

FIG. 2 is a top schematic view of the ferroelectric storage media 37 in accordance with an aspect of the invention. The media surface 39 is accessible by a scanning motion of the transducers 36 and in particular by a tip 36a of the transducers 36, wherein only a single transducer 36 and corresponding tip 36a are schematically shown in FIG. 2 for illustration purposes. The storage media 37 includes a first media region 54 for storing user data. The first media region 54 includes a plurality of first domains 55 having a switchable (i.e. rewritable for an applied voltage signal) polarization state. The domains 55 are schematically shown in the cutaway portion 33 of the storage media 37 that illustrates an example track 57. It will be appreciated that the domains 55 may have a polarization pointing up or down.

Still referring to FIG. 2, the storage media 37 also includes a second media region 56 that includes a plurality of second domains. The plurality of second domains includes a first switchable (i.e. rewritable for the applied voltage signal) polarization state domain 58 (see FIG. 4A) and a second switchable polarization state domain 60 (see FIG. 4A). Position data, which also may be referred to as servo data or servo information, is stored in the second media region 56. It will be appreciated that the storage media 37 may also include additional second media regions, such as media region 156, for storing position data at various locations on the media surface 39.

The first switchable polarization state domain 58 and the second switchable polarization state domain 60 are both switchable by an applied signal (e.g., a readback voltage signal). However, the first switchable polarization state domain 58 is modified to, for example, increase the coercive voltage thereof. This will result in the first switchable polarization state domain 58 having a feedback signal (e.g., a readback current signal) that is different from the feedback signal for the second switchable polarization state domain 60, as will be explained herein. By increasing the coercive voltage and keeping the read voltage unchanged, one may achieve a narrower trackwidth because the portion of the transducer's fringing field higher than the coercive field is smaller. Since the readback signal is proportional to the trackwidth, the readback signal will be lower on the areas with higher coercive field.

The modification of the first switchable polarization state domain 58 may be done, for example, at the time of manufacture of the storage media 37. The modification may be, for example, an ion implantation process to modify the coercive voltage, or inducing surface chemical and/or structural disorder so as to result in a differing feedback signal.

Figure 3:
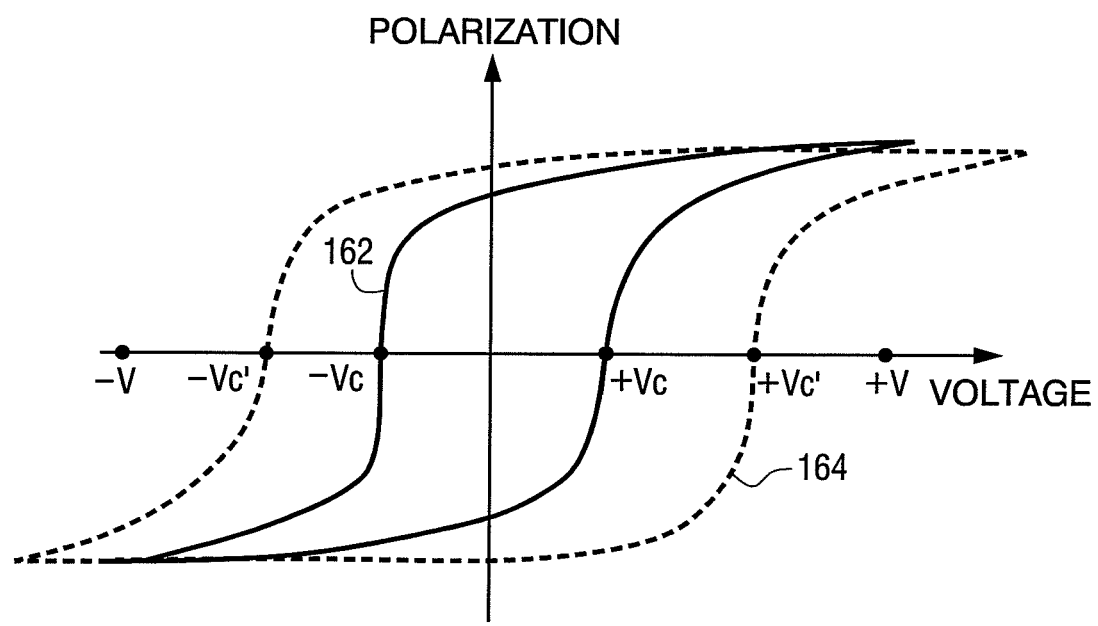
FIG. 3 illustrates a hysteresis loop of polarization of a ferroelectric material that has not been ion implanted (solid line) and of a ferroelectric material that has been ion implanted (dashed line), according to one aspect of the invention.

Referring to FIG. 3, the use of ion implantation to establish the first switchable polarization state domain 58 will be described. Ion implantation generally involves producing localized regions of different electrical activity in the ferroelectric material. The implantation results in, among other things, the coercive voltage of the ferroelectric material being increased and the polarization of the material remaining stable for an applied voltage that is less than the increased coercive voltage value. FIG. 3 illustrates a typical hysteresis loop 162, shown in solid line, for a ferroelectric material that has not been ion implanted. A horizontal axis represents voltage and a vertical axis represents polarization. The hysteresis loop 162 illustrates that for the chosen ferroelectric material a coercive voltage, Vc, must be applied to switch the polarization. FIG. 3 also illustrates a typical hysteresis loop 164, shown in dashed line, for a ferroelectric material that has been ion implanted. The hysteresis loop 164 illustrates that for the ion implanted ferroelectric material a coercive voltage, Vc', must be applied to switch the polarization. The ion implantation results in an increased coercive voltage, i.e. Vc'>Vc. Thus, if ion implantation is applied to the domains 58 they would have a corresponding coercive voltage, Vc'. The domains 60 would maintain the coercive voltage, Vc. For an applied voltage signal, V, such that Vc<Vc'<V, the polarization of the domains 58 and 60 would switch. In other words, if the magnitude of the voltage signal V is greater than the magnitude of the coercive voltages Vc and Vc', the polarization of the domains 58 and 60 would switch.

FIG. 4A illustrates a schematic cross-sectional view taken along line 4A-4A of FIG. 2. Specifically, FIG. 4A shows a polarization pattern of the first switchable polarization state domains 58 and the second switchable polarization state domains 60 contained in the storage layer 38 of the storage media 37 for providing the described position data in the second media region 56. FIG. 4B corresponds to FIG. 4A and graphically illustrates current flow for polarization reversal (i.e., polarization switching) when a voltage signal (e.g. a readback voltage signal V) is applied to the storage media 37. The first switchable polarization state domains 58 and the second switchable polarization state domains 60 both switch for the applied signal (assuming that the applied voltage signal V is greater than the coercive voltage Vc of the domains 60 and that V is greater than the coercive voltage Vc' of the modified domains 58 as described herein). However, because the domains 58 have been modified, the measurable current flow for domains 58 (i.e., feedback signal) is different than the measurable current flow for the domains 60 at the applied signal. For example, in FIG. 4B the domains 58 are represented by a binary 1' and the domains 60 are represented by a binary 1 wherein the measurable current flow for the domains 58 is less than the measurable current flow for the domains 60. This represents the case when both domains 58 and 60 are switching under the applied voltage V. The resulting position data polarization pattern for this example is, therefore, 1'-1-1'-1-1'-1. The polarization pattern is recognizable by the servo system that positions the transducer 36 relative to the storage media 37 based on the feedback of the position data. It will be appreciated that providing various combinations of domains 58 and domains 60 may provide various polarization patterns in accordance with the invention.

FIG. 4C corresponds to FIG. 4A and graphically illustrates current flow as a result of polarization not switching for an applied voltage signal, according to one aspect of the invention. Specifically, in FIG. 4C the domains 58 are represented by a binary 0' and the domains 60 are represented by a binary 0 wherein the measurable current flow for the domains 58 is greater than the measurable current flow for the domains 60. In one aspect, the measurable current flow for domains 60 is about zero. The non-zero (0') signal for domains 58 is due to the ion implantation induced leakage. The resulting position data polarization pattern for this example is, therefore, 0'-0-0'-0-0'-0. The polarization pattern is recognizable by the servo system that positions the transducer 36 relative to the storage media 37 based on the feedback of the position data. In addition, it will be appreciated that when the domains 58 and 60 have various combinations of polarization direction, the resulting feedback signals could be a combination of 1, 1', 0 and/or 0' signals as illustrated in FIGS. 4B and 4C.

The switchable polarization state domains 55 contained in the first media region 54 are switchable for an applied voltage signal (e.g., a readback voltage signal V). In one aspect, the domains 55 have a coercive voltage that is substantially equal to the coercive voltage of the second switchable polarization state domains 60.

After the position data has been read and processed, a voltage signal will be applied to the second media region 56 to reset the switchable domains 58 and 60 to their original polarization state. Advantageously, this provides for the position data polarization pattern to be reset for a period of time, e.g. the lifetime of the ferroelectric storage media, without the data polarization pattern being affected by creep because, for example, the chemical and/or structural modifications are locked to the surface.

In accordance with an aspect of the invention, a method includes providing a ferroelectric layer (e.g., ferroelectric storage layer 38), and establishing a polarization pattern in the ferroelectric layer to represent position data. The polarization pattern includes the first switchable polarization state domain (e.g., domains 58) and the second switchable polarization state domain (e.g., domains 60) that are both switchable for an applied signal. The first switchable polarization state domain has a first feedback signal for the applied signal that is different than a second feedback signal of the second switchable polarization state domain for the applied signal. The first switchable polarization state domain may be established by, for example, ion implantation, as described herein.

The implementation described above and other implementations are within the scope of the following claims.

What is claimed is:
1. An apparatus, comprising:
a ferroelectric layer; and
a polarization pattern configured in said ferroelectric layer to represent position data, the polarization pattern having a first switchable polarization state domain and a second switchable polarization state domain that are both switchable by an applied signal, wherein said first switchable polarization state domain has a first feedback signal in response to the applied signal that is different than a second feedback signal of said second switchable polarization state domain at the applied signal.

2. The apparatus of claim 1, wherein the first feedback signal is greater than the second feedback signal.

3. The apparatus of claim 1, wherein the first feedback signal is less than the second feedback signal.

4. The apparatus of claim 1, wherein said first switchable polarization state domain has a first coercive voltage magnitude that is greater than a second coercive voltage magnitude of said second switchable polarization state domain.

5. The apparatus of claim 4, wherein the applied signal is a voltage signal having a magnitude that is greater than the first coercive voltage magnitude and the second coercive voltage magnitude.

6. The apparatus of claim 1, wherein said ferroelectric layer is configured as a data storage layer.

7. The apparatus of claim 6, wherein said ferroelectric layer further comprises a plurality of switchable state domains that represent user data.

8. The apparatus of claim 7, wherein said plurality of switchable state domains are switchable by the applied signal.

9. The apparatus of claim 1, further comprising an additional polarization pattern configured in said ferroelectric layer to represent position data.

10. An apparatus, comprising:
a first ferroelectric region having a plurality of first domains that each have a switchable polarization state; and
a second ferroelectric region adjacent said first ferroelectric region wherein the second ferroelectric region contains position data, said second ferroelectric region having a plurality of second domains that includes: a first switchable polarization state domain and a second switchable polarization state domain that are both switchable by an applied signal, wherein said first switchable polarization state domain has a first feedback signal in response to the applied signal that is different than a second feedback signal of said second switchable polarization state domain at the applied signal.

11. The apparatus of claim 10, wherein the first ferroelectric region and the second ferroelectric region are configured to form a data storage medium.

12. The apparatus of claim 11, wherein the first ferroelectric region contains user data.

13. The apparatus of claim 10, wherein the plurality of first domains is switchable by the applied signal.

14. A method, comprising:
providing a ferroelectric layer; and
establishing a polarization pattern configured in said ferroelectric layer to represent position data, the polarization pattern having a first switchable polarization state domain and a second switchable polarization state domain that are both switchable by an applied signal, wherein said first switchable polarization state domain has a first feedback signal in response to the applied signal that is different than a second feedback signal of said second switchable polarization state domain at the applied signal.

15. The method of claim 14, further comprising applying ion implantation to create the first polarization state domain.

16. The method of claim 14, further comprising the first switchable polarization state domain having a first coercive voltage magnitude that is greater than a second coercive voltage magnitude of the second switchable polarization state domain.

17. The method of claim 16, further comprising the applied signal being a voltage signal having a magnitude that is greater than the first coercive voltage magnitude and the second coercive voltage magnitude.

18. The method of claim 14, further comprising configuring the ferroelectric layer as a data storage layer.

19. The method of claim 14, further comprising obtaining the first feedback signal and the second feedback signal by not switching the polarizations of the first switchable polarization state domain or the second switchable polarization state domain.

* * * * *